Patented June 2, 1936

2,042,549

UNITED STATES PATENT OFFICE 2,042,549

PROCESS OF REMOVING WATER FROM CYANID

Edward J. Pranke, Great Barrington, Mass., assignor to E. I. du Pont de Nemours & Company, Inc., a corporation of Delaware No Drawing. Application December 18, 1934, Serial No. 758,095

2 Claims. (Cl. 23—79)

This invention relates to the removal of water from sodium cyanid and is in part a continuation of my U. S. application Serial No. 622,825. The object of the invention is to recover substantially all the cyanid in a dry product of high commercial analysis.

It is commonly known that when sodium cyanid solutions are heated, in order to evaporate the water, decomposition of the cyanid takes place rapidly at temperatures of boiling under atmospheric pressure. In order to reduce the decomposition to a minimum it has been a common practice heretofore to carry out the evaporation at temperatures as low as 36 to 45 degrees centigrade, under vacua of approximately 30 inches to about 29.5 inches of mercury, respectively. Not only, however, is it difficult and costly to maintain such high vacua in practice but the cyanid decomposes nevertheless, the resulting product under industrial conditions often containing only 90/92 percent sodium cyanid.

I have found from numerous experiments that while the rate of decomposition of sodium cyanid at the boiling point (circa 124° C.) of a pure saturated solution at atmospheric pressure amounts per minute to about 0.42 percent of the cyanid present, the total amount of decomposition can nevertheless be kept within small limits provided the evaporation of the water, to leave a substantially dry product, is carried out in a brief time from a concentrated solution.

I have found that by applying a thin layer of solution to an extended solid surface, for example an iron surface, heated at a temperature sufficiently above the boiling point of a saturated sodium cyanid solution to transmit heat rapidly from the solid surface to the thin layer of solution the water may be substantially completely evaporated in a period of from a few seconds to approximately one to several minutes, depending on the amount of solution applied on a unit of area and the temperature of the heated surface. Using a substantially constant brief period of evaporation to dryness of about 30 seconds I have obtained the following results with solutions of sodium cyanid in various concentrations, Series A being obtained with solutions of high purity made by dissolving sodium cyanid dihydrate crystals, 99.70 percent pure, in water, and Series B obtained with solutions made from commercial sodium cyanid containing 97.35 percent sodium cyanid on a dry basis and about 2.65 percent other soluble solids.

Series A

| Composition of material treated | | Ratio water to NaCN | Analysis dried product percent NaCN | Degradation percent NaCN | Column 5 divided by column 3 |
|---|---|---|---|---|---|
| Percent NaCN | Percent water | | | | |
| 54.7 | 45.1 | 0.82 | 98.60 | 1.10 | 1.34 |
| 43.3 | 56.6 | 1.31 | 98.25 | 1.45 | 1.11 |
| 39.1 | 60.8 | 1.56 | 97.60 | 2.10 | 1.35 |
| 29.3 | 70.6 | 2.40 | 96.60 | 3.10 | 1.29 |
| 19.5 | 80.4 | 4.12 | 94.15 | 5.55 | 1.34 |
| 9.8 | 90.2 | 9.23 | 89.50 | 10.20 | 1.11 |

Series B

| Composition of material treated | | Ratio water to NaCN | Analysis dried product percent NaCN | Degradation percent NaCN | Column 5 divided by column 3 |
|---|---|---|---|---|---|
| Percent NaCN | Percent water | | | | |
| 96.9 | 0.5 | | 97.35 | | |
| 88.5 | 9.1 | .10 | 97.28 | 0.07 | .70 |
| 77.9 | 20.0 | .26 | 97.10 | .25 | .96 |
| 64.8 | 33.3 | .51 | 96.60 | .75 | 1.47 |
| 48.6 | 50.0 | 1.03 | 96.00 | 1.35 | 1.31 |
| 32.4 | 66.7 | 2.06 | 94.40 | 2.95 | 1.43 |
| 19.5 | 80.0 | 4.12 | 91.80 | 5.55 | 1.35 |
| 10.8 | 89.0 | 8.24 | 86.60 | 10.75 | 1.30 |

If the degradation in analysis as reported in Series A and B is plotted against the ratio of water to sodium cyanid in solution it will be found that the degradation is directly proportional to the number of parts of water removed from a given number of parts of sodium cyanid. In the above examples the degradation in analysis is equal to approximately 1.3 times the ratio of the percentage of water to percentage of sodium cyanid in the solution before drying. This factor is somewhat smaller or larger respectively as the time of drying is less or more than that used in the experiments reported, being about 1.1 for a drying time of several seconds and about 1.6 for a drying time of several minutes.

I have also found by appropriate analyses that the decomposition of 1 percent of sodium cyanid produces approximately 1.25 percent of decomposition products; hence, the decomposition rate of 0.42 percent of the sodium cyanid per minute that occurs in a boiling saturated solution, as pointed out above, causes a degradation of about 0.52 percent in the final dried product. Since it is quite practicable to evaporate a thin layer of solution to dryness in less than one minute, as described hereinafter, it is seen from Series A and B that the dominant factor in obtaining a small percentage of degradation is the concentration of the sodium cyanid solution employed, the time factor, with short drying periods, being of relatively minor importance.

The standard, highest-test commercial sodium cyanid on the market for many years past has been a white, fused and cast 96/98 percent sodium cyanid actually having a minimum analysis of about 96.5 to 97.0 percent NaCN. Since it is practically impossible to start with aqueous sodium cyanid solutions that are absolutely chemically pure and since in fusing dried sodium cyanid to produce a white product there is usually a degradation of about 0.5 to 0.8 percent I regard a practically pure solution containing approximately 28 to 30 percent NaCN as of substantially the minimum concentration from which one can in practice obtain dry sodium cyanid which can be subsequently fused and sold with a minimum guarantee of 96 percent sodium cyanid.

In practicing my invention I prefer to apply the concentrated solution, preferably containing about 40 percent sodium cyanid, or more, and with as little preheating as possible, to the surface of a rotary atmospheric drum dryer, preferably heated internally by steam, and provided with a suitable knife edge to cut off the deposit of solid cyanid produced. Obviously, I may use instead a flat drying surface and a movable knife to cut off the solid cyanid. The drying surface need not necessarily be of metal; for example, it may be of suitable ceramic material.

I have found that suitable temperatures of the drying surface are from just above the boiling point of the applied solution at saturation to as high as 300° C. or higher, but I prefer to use a temperature of about 150° to 180° C. At temperatures above about 200° C. I have found that the water is evaporated with such rapidity that a considerable amount of cyanid in solution or as a dry dust is entrained with the water vapor leaving the drying surface.

I have also found that the greater the ratio of water to solids the greater is the loss of cyanid by entrainment in the vapor leaving the drying surface. For this reason, also, I prefer to use solutions containing at least 28 to 30 percent sodium cyanid. I have found that when using more dilute solutions the deposit of solid cyanid left on the drying surface is very thin and is difficult to cut off by means of the knife edge on a rotary drum dryer and instead of being cut off cleanly a certain amount tends to pass beneath the cutting edge, and due to the pressure of the latter upon the drying surface tends to form a hard, glass-like coating which interferes with the rapid drying of the subsequently applied solution and its convenient removal. While I have found that such a coating can be readily removed by applying to it a small amount of water or very dilute solution, preferably as a spray, these difficulties are substantially avoided when employing concentrated solutions.

At any given temperature of the drying surface the drying time is, of course, dependent upon the thickness of the layer of solution applied and its uniformity. I prefer to apply the solution as uniformly as possible at such a rate per unit area of drying surface that the drying will be substantially completed in about 10 to 30 seconds with a drying surface temperature of about 150° to 160° C.

The solution is preferably applied in the form of a spray, but it may also be brushed on, dropped, splashed or flowed on, or the drying surface may be dipped into the solution, or any other means of application may be used that will apply the solution in a thin layer adhering to the drying surface. If desired, applications of solution may be superimposed upon previously dried or partially dried material to form a thin layer of solid cyanid.

Since the moisture which may adhere to solid sodium cyanid dissolves some of the sodium cyanid with which it is in contact, my process is suitable for drying a damp mass of sodium cyanid. Also, since sodium cyanid forms a hydrate, $NaCN,2H_2O$, which dissolves in its own water of crystallization when heated to about 34° C., I may apply such crystals directly to the heated surface, instead of first preparing a solution, and the claims are to be so understood.

If I desire, I may remove the product from the drying surface before it is completely dry, and I may then remove the remaining percentage of water by spreading the product on a hot plate and stirring until substantially all moisture is removed.

While it is usually unnecessary to do so I may cause the drying to take place more rapidly by placing the drying surface under partial vacuum.

What I claim is:

1. The process of removing water from sodium cyanid solutions which consists in applying a sodium cyanid solution containing more than 28 percent sodium cyanid, in a thin, adhering layer to a solid surface heated above the boiling temperature of the solution at saturation and evaporating water from said solution in a brief time to produce solid sodium cyanid on said surface and removing said cyanid from said surface.

2. The process of removing water from cyanid solutions which consists in applying an alkali metal cyanid solution containing cyanid equivalent to more than 28 percent of sodium cyanid in a thin, adhering layer to a solid surface heated above the boiling temperature of the solution at saturation and evaporating water from said solution in a brief time to produce solid alkali metal cyanid on said surface and removing said solid cyanid from said surface.

EDWARD J. PRANKE.